(12) United States Patent
Belen'kii et al.

(10) Patent No.: US 6,853,331 B1
(45) Date of Patent: Feb. 8, 2005

(54) METHOD OF COMPENSATING FOR ATMOSPHERIC EFFECTS WHILE USING NEAR HORIZON RADAR UTILIZING A DOPPLER SIGNAL

(75) Inventors: Mikhail S. Belen'kii, San Diego, CA (US); Ernest Jefferson Holder, Marietta, GA (US); Susan Ferebee Dugas, Woodstock, GA (US); Christian Rocken, Boulder, CO (US); Anthony Lowry, Boulder, CO (US)

(73) Assignees: Georgia Tech Research Corporation, Atlanta, GA (US); University Corporation for Atmospheric Research, Boulder, CO (US)

(*) Notice: Subject to any disclaimer, the term of this patent is extended or adjusted under 35 U.S.C. 154(b) by 0 days.

(21) Appl. No.: 10/370,256

(22) Filed: Feb. 20, 2003

Related U.S. Application Data
(60) Provisional application No. 60/358,274, filed on Feb. 20, 2002.

(51) Int. Cl.$^7$ .............................................. G01S 13/00
(52) U.S. Cl. .......................... 342/159; 352/26; 352/59; 352/179; 352/195
(58) Field of Search ............................ 342/26, 59, 148, 342/159, 179, 180, 195, 357.06, 357.08, 460

(56) References Cited

U.S. PATENT DOCUMENTS

| | | | |
|---|---|---|---|
| 5,402,116 A | * | 3/1995 | Ashley ..................... 340/870.1 |
| 5,675,081 A | * | 10/1997 | Solheim et al. ........... 73/170.28 |
| 6,182,011 B1 | * | 1/2001 | Ward .......................... 701/213 |
| 6,421,528 B1 | * | 7/2002 | Rosen et al. ............. 455/67.16 |
| 6,563,452 B1 | * | 5/2003 | Zheng et al. ................. 342/26 |
| 6,587,687 B1 | * | 7/2003 | Wiedeman ................. 455/428 |
| 2004/0001720 A1 | * | 1/2004 | Krill et al. ................... 398/125 |

OTHER PUBLICATIONS

Randolph Ware et al., GPS surveying with 1 mm precision using corrections for atmospheric slant path delay, University Navstar Consortium/University Corporation for Atmospheric Research, 4 pgs.

(List continued on next page.)

*Primary Examiner*—Thomas H. Tarcza
*Assistant Examiner*—Isam Alsomiri
(74) *Attorney, Agent, or Firm*—David C. Jenkins; Eckert Seamans Cherin & Mellott, LLC

(57) ABSTRACT

A method of compensating for atmospheric effects to detect the actual location of low elevation objects using near horizon radar to detect an object which utilizes a preexisting satellite structured to send a signal indicating the position and velocity of said satellite, wherein the location of the satellite is known. The method includes a step of providing a radar site, a first receiver structured to receive a signal from the satellite indicating an apparent location of the satellite, and a second receiver, located at a distance from the radar site, structured to receive the satellite signal and which indicates the observed location of the satellite. The first receiver is utilized to receive a signal from the satellite when the satellite is at a low elevation. This signal indicates the apparent location and velocity of the satellite. The bending angle can then be determined by comparing the apparent location data of the satellite as determined by the first receiver to the observed location data of the satellite. The satellite signal is used to determine the Doppler shift of the signal at the radar site as compared to the signal from the observed location. The Doppler shift data is used to determine the bending angle. Once the bending angle of the atmosphere is determined, the radar is used to detect the apparent location data of a low elevation object. The location of the low elevation object can then be determined by applying the bending angle to the apparent location data of the object.

15 Claims, 5 Drawing Sheets

OTHER PUBLICATIONS

Christian Rocken, et al., "Near real–time GPS sensing of atmospheric water vapor", University Navstar Consortium (UNACCO), University Corporation for Atmospheric Research (UCAR), 4 pgs., Boulder, Colorado.

"Development of SuomiNet—A Prototype National Geophysical Instrument", Draft Suominet Science Plan, Jul. 1, 1998, pp. 1–9.

V.V. Varob'ev and T.G. Krasil'nikova, "Estimation of the Accuracy of the Atmospheric Refractive Index Recovery From Doppler Shifter Measurements at Frequencies Used in the NAVSTAR System", Physics of the Atmosphere and Ocean, Apr. 1994, 8 pgs., vol. 29, No. 5.

C. Rocken et al., "Analysis and validation of GPS/MET data in the neutral atmosphere", Accepted Aug. 25, 1997 to appear in JGR early 1998, pp. 1–19.

* cited by examiner

METHOD OF COMPENSATING FOR ATMOSPHERIC EFFECTS WHILE USING NEAR HORIZON RADAR UTILIZING A DOPPLER SIGNAL

CROSS-REFERENCE TO RELATED APPLICATIONS

This application claims priority under 35 U.S.C. § 119(e) to provisional application Ser. No. 60/358,274, filed Feb. 20, 2002.

BACKGROUND OF THE INVENTION

1. Field of the Invention

This invention relates to a method of compensating for atmospheric distortion while using a radar to detect the position of an object that is near the horizon relative to the radar site and, more specifically, to a method of determining the temporary bending angle of the atmosphere by analyzing the Doppler shift in signals from the apparent position of low-elevation man-made satellites to the known position of the satellite.

2. Background Information

Radar waves, like all light waves, are subject to distortion as the waves pass through the atmosphere and, more specifically, the troposphere. The distortion of the waves is caused by both large-scale effects and small-scale effects. Large-scale effects include refraction due to layers of gas with different densities in the atmosphere. Small-scale effects are caused by turbulence and heat gradients. Refraction by large-scale effects cause an object outside the atmosphere to appear in a location other than the object's actual location. Small-scale effects cause an object outside of the atmosphere to twinkle. The distortion due to large-scale refraction error for low elevation targets can be 2–10 mrad.

It is desirable to know the actual location of long range, low elevation objects such as, but not limited to, missiles as soon as possible so that an accurate trajectory may be determined. Thus, methods of correcting for the distortion caused by large scale effects have been developed. There are two common methods for determining the atmospheric "bending angle," that is, the angle that the atmosphere bends light waves, caused by refraction. The Standard Atmospheric Model relies on a historical model of the atmosphere and on an assumption that earth and the atmosphere are spherical. This model is easy to compute and is functional for objects at higher elevations. However, the assumptions used to create this model result in a significant degree of error for objects at low elevations.

The second method relies on a three-dimensional model of the atmosphere based on National Weather Prediction data. The three-dimensional model is an improvement on the Standard Atmospheric Model as the assumptions are removed and replaced with data representative of the actual atmosphere. The National Weather Service collects data from satellites, balloons, ground stations and other sources and makes this data available to the public. The disadvantage to this method is that the National Weather Service data is only updated once about every six hours. Thus, the National Weather Prediction model relies on old data and may not be relevant in changing conditions.

There is a need for a method of compensating for atmospheric effects while using radar to detect an object near the horizon that determines a real time bending angle by comparing the Doppler shift in a signal from the observed location of a low elevation object to the signal from the apparent location of the low elevation object.

There is a further need for a method of compensating for atmospheric effects that reduces the refraction error for objects at a low elevation to less than 50 $\mu$rad.

There is a further need for a method of compensating for atmospheric effects that utilizes existing equipment.

SUMMARY OF THE INVENTION

These needs, and others, are met by the present invention which provides a method of compensating for atmospheric effects that determines the bending angle of the atmosphere about once every 30 minutes utilizing a plurality of man made satellites, such as the Global Positioning System ("GPS") satellites. The GPS satellite system currently includes 26 satellites which rise or set about once every 30 minutes. It is desirable to use the GPS satellites in conjunction with this method as the locations of the GPS satellites are carefully monitored. Additionally, the GPS satellites send a signal that indicates, among other data, the position and velocity of the satellite. Throughout the remainder of the specification, the name "GPS satellites" will be used, however, any man-made satellite or satellite system may be used to perform the disclosed method.

Because the position of the GPS satellites is known, the bending angle of the atmosphere can be determined by comparing the apparent location of the satellite, that is the location as seen by the radar site and which is distorted due to atmospheric distortion, to the location of the satellite as observed from a remote location that is not affected by the near-horizon bending angle. This calculation of the bending angle can be performed each time a GPS satellite rises or sets. Additionally, the calculation of the bending angle can be improved and adapted by recording relevant weather data at the radar site. The weather data may be collected in real time near the radar site, or may be acquired from the National Weather Service which provides global weather data. Such weather data can be used to create a three-dimensional model and used to further refine the calculation of the bending angle.

In this embodiment of the method, the first GPS receiver is stationed near the radar site, the second GPS receiver is a distance, preferably over 100 km, away from the radar site. The second receiver has a high elevation view of the GPS satellite when the radar site has a low elevation view of the GPS satellite. Thus, the position of the satellite as seen by the second receiver is not substantially affected by refraction. As such, the observed position of the satellite at the second receiver site is not substantially affected by atmospheric refraction. The GPS satellite produces a signal that is acquired by the two GPS receivers. The low altitude signal, by virtue of passing through more atmosphere than the signal sent to the second GPS receiver, will be different than the high altitude signal. By analyzing the Doppler shift between the two signals, the bending angle may be determined.

Thus, the disclosed method is an improvement over the standard atmospheric model because the disclosed method does not rely on the assumption of spherical symmetry. The disclosed method is also an improvement over the three-dimensional refractivity model as the atmospheric data is updated about every 30 minutes. Moreover, because the observed position of the satellites relatively accurate, the accuracy of the bending angle calculation is such that when the calculated bending angle is applied to the apparent position of another object at a low elevation, the error in determining the object's location is reduced to less than 50 grad.

It is an object of this invention to provide a method of compensating for atmospheric effects while using radar to detect an object near the horizon that determines a real time bending angle by comparing the observed location of a low elevation object to the apparent location of the low elevation object.

It is a further object of this invention to provide a method of compensating for atmospheric effects that reduces the refraction error at low elevations to less than 50 μrad.

It is a further object of this invention to provide a method of compensating for atmospheric effects that utilizes existing equipment.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "elevation" shall mean the angle of an object above the horizon relative to an observer and does not refer to the altitude of an object above the surface of the earth. Thus, an object may have an altitude many kilometers above the earth and still have a low "elevation" as seen from a distant site.

As used herein, "low elevation" shall mean an elevation between about 0° and 14°, where 0° is a line tangent to the horizon.

As used herein, "high elevation" shall mean an elevation between 15° and 90° where an object at 90° is directly overhead.

As used herein "actual location" shall mean the true location of an object.

As used herein "known location" shall mean the location of a satellite, such as a GPS satellite, based upon the most recently available data. Typically, the known location is the best estimation of the actual location of a satellite.

As used herein "observed location" shall mean the location of an object seen at a high elevation. That is, the observed location of an object is where an object appears when the light sent from, or reflected off of, the object has not been significantly refracted through the atmosphere.

As used herein "apparent location" shall mean the location at which a low elevation object appears due to atmospheric refraction. The apparent location is not typically the actual location of the object.

Figure 1:
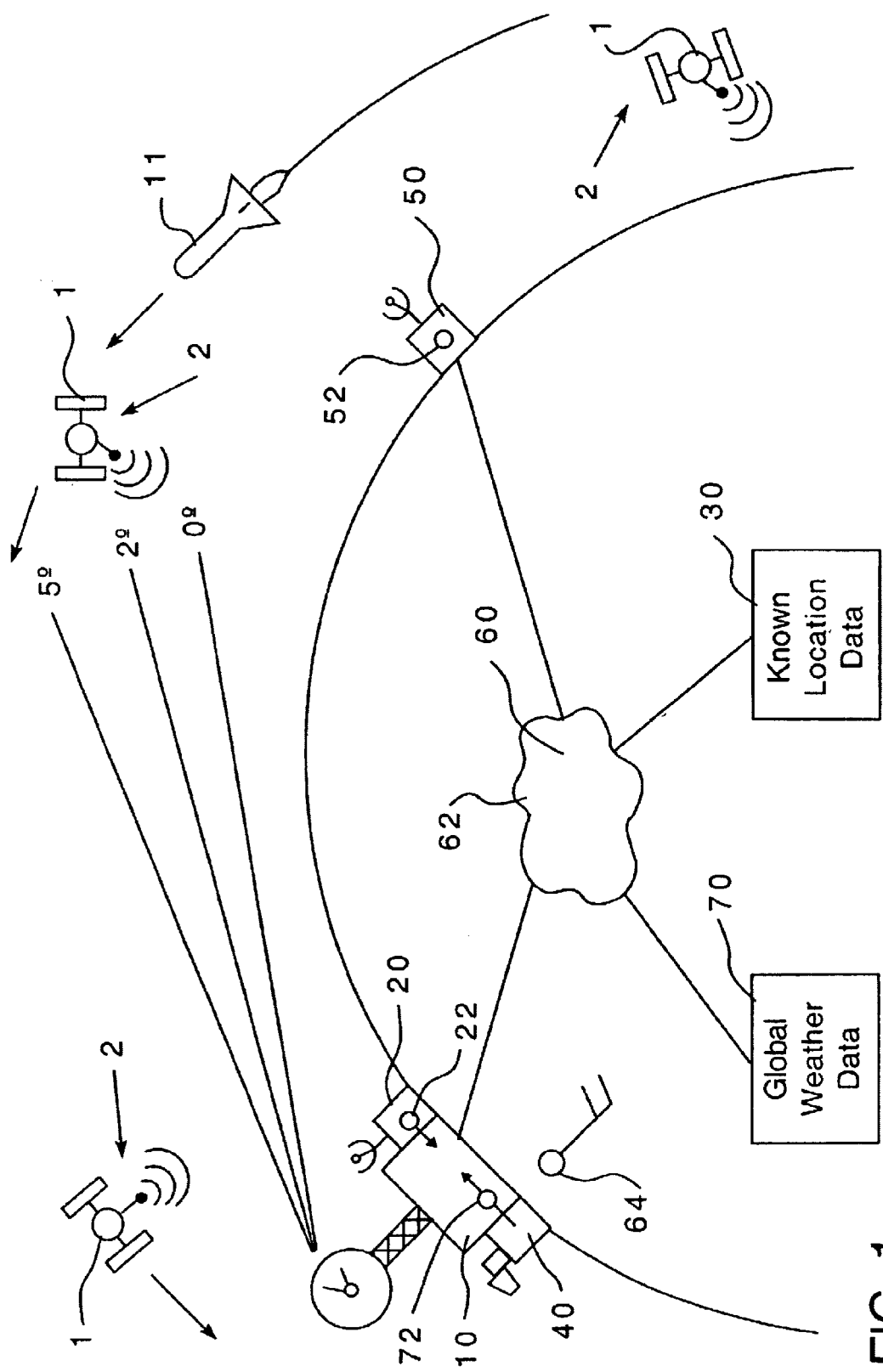
FIG. 1 is a schematic diagram of the atmospheric effects compensation system.

As shown in FIG. 1, the components required to perform the method include a radar site 10, a first receiver 20 structured to receive a signal from a satellite 1, and data 30 representing the known location of a satellite (hereinafter "known location data 30"). The radar site 10 is structured to send a radar signal and receive a reflected signal from an object 11 as is known in the art. The object 11 is preferably a long range object at an altitude above the troposphere of the earth. The known location data 30 may be acquired from orbital prediction software 72 or transferred from a remote database over the communication medium 60 (described below). The first receiver 20 is preferably a GPS receiver structured to receive signals and data from a GPS satellite 1. When GPS satellites 1 are used, the known location data 30 is publicly available and frequently updated by the International GPS Services. The GPS satellite system includes a plurality of satellites 1 which provide a signal 2 indicating a time and a position along with other data. The components may further include a weather station 40 incorporated into the radar site 10, second receiver 50 structured to receive a signal from the satellite 1, a communication medium 60, such as, but not limited to, the Internet 62, and weather data 70. The weather data 70 may be local weather data 72 collected by the weather station 40 or global weather data 74 collected by the U.S. National Weather Service. The first receiver 20 is located near, that is, within 1 km, of the radar site 10. The first receiver 20 generates apparent location data 22 for a GPS satellite 1 at a low elevation. The weather station 40 is also located near the radar site 10, and is structured to record and transmit real time local weather data 72 such as, but not limited to, atmospheric pressure, temperature, and humidity. The second receiver 50 is located at a distance, preferably over 100 kilometers to the west, from the radar site 10. The second receiver 50 generates observed location data 52 for a GPS satellite 1 at a high elevation. The second receiver 50 is preferably located to the west of the radar site 10 because satellites travel, generally, west to east across the sky and, therefore, the satellite will be at a high elevation relative to the second receiver 50 when the satellite is at a low elevation relative to the radar site 10. However, at higher latitudes, the second receiver 50 may be located more to the southwest, in the Northern Hemisphere, or more to the northwest, in the Southern Hemisphere.

Figure 2:
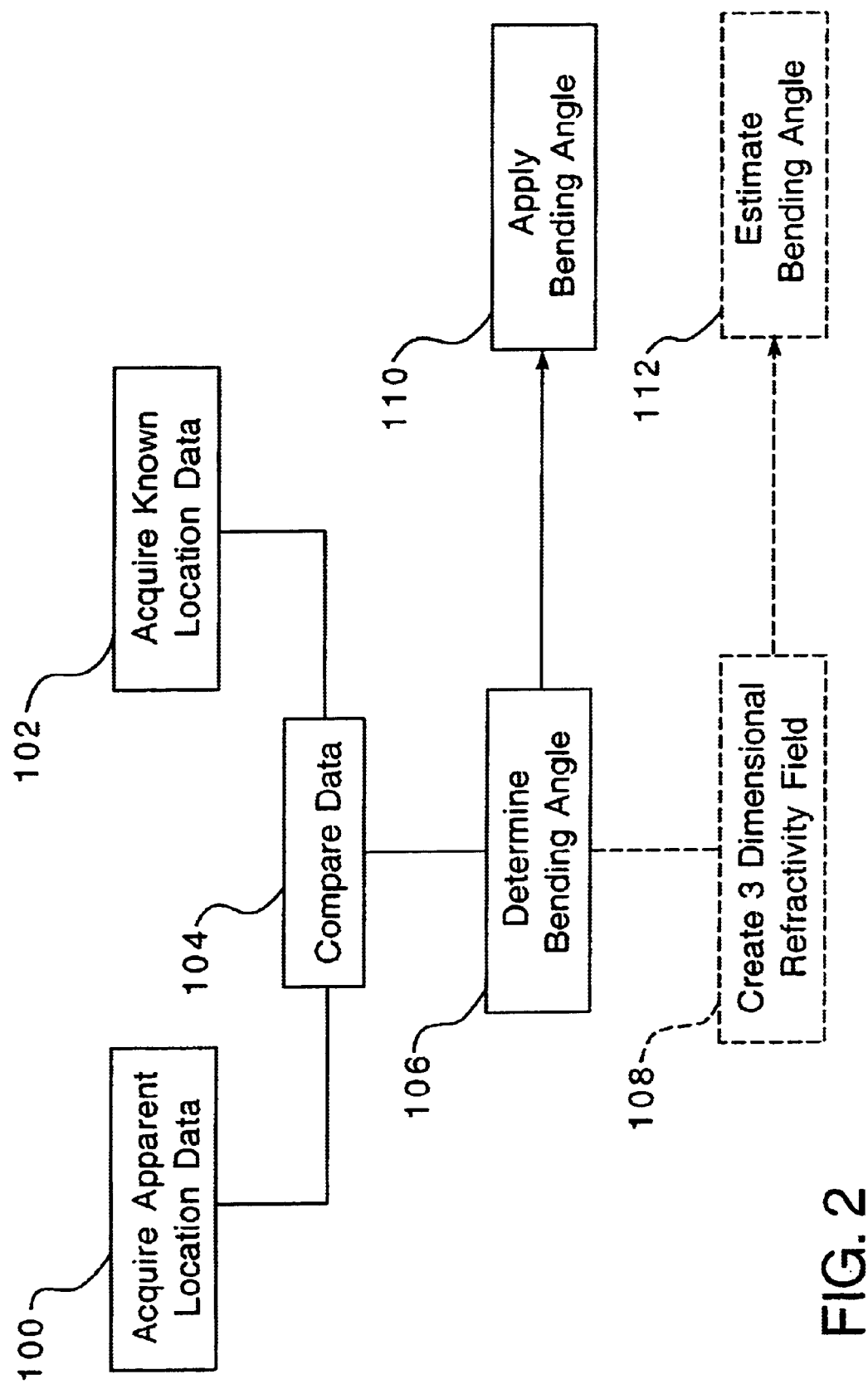
FIG. 2 is a flow chart of the method.

As shown in FIG. 2, a method of computing the bending angle of the atmosphere may be accomplished using the radar site 10, the first receiver 20, and the known location data 30. In this embodiment the first receiver 20 acquires and logs 100 the apparent location data 22 for the satellite 1 as the satellite 1 is at a low elevation. At about the same time, known location data 30 is acquired 102. The apparent location data 22 logged by the first receiver 20 and the known location data 30 is compared 104 and a bending angle is determined 106. This procedure is repeated every time a satellite 1 rises or sets. The collected data may be stored and further used to create 108 a three-dimensional bending angle model for predicting a bending angle when no satellite 1 is present. Because the satellites 1 do not rise at the same point on the horizon, the model will encompass the entire horizon, or a substantial are of the horizon, depending upon the latitude of the radar site 10.

Once the bending angle is determined 106, the location of a low elevation object 11 other than the satellite 1 may be determined by applying 110 the computed bending angle to the apparent position of the object 11 as detected by the radar site 10. That is, the radar site 10 sends a signal which is reflected off the object 11. While the object 11 is at a low elevation, the reflected radar signal will be refracted by the atmosphere in a manner substantially similar to the refracted satellite signal 2. Thus, the radar site 10 will only detect the apparent position of the object 11. Applying 110 the bending angle to the apparent location of the object 11 will compensate for the atmospheric effects and the location of the object 11 is more accurately calculated. Generally, the calculated location of the object 11 is less than about 50 μrad from the actual location. Alternatively, if no satellite 1 has recently risen or set at a point on the horizon adjacent to the object 11, the three-dimensional bending angle model may be used to estimate the bending angle to be applied 112 to the apparent location of the object 11.

Figure 3:
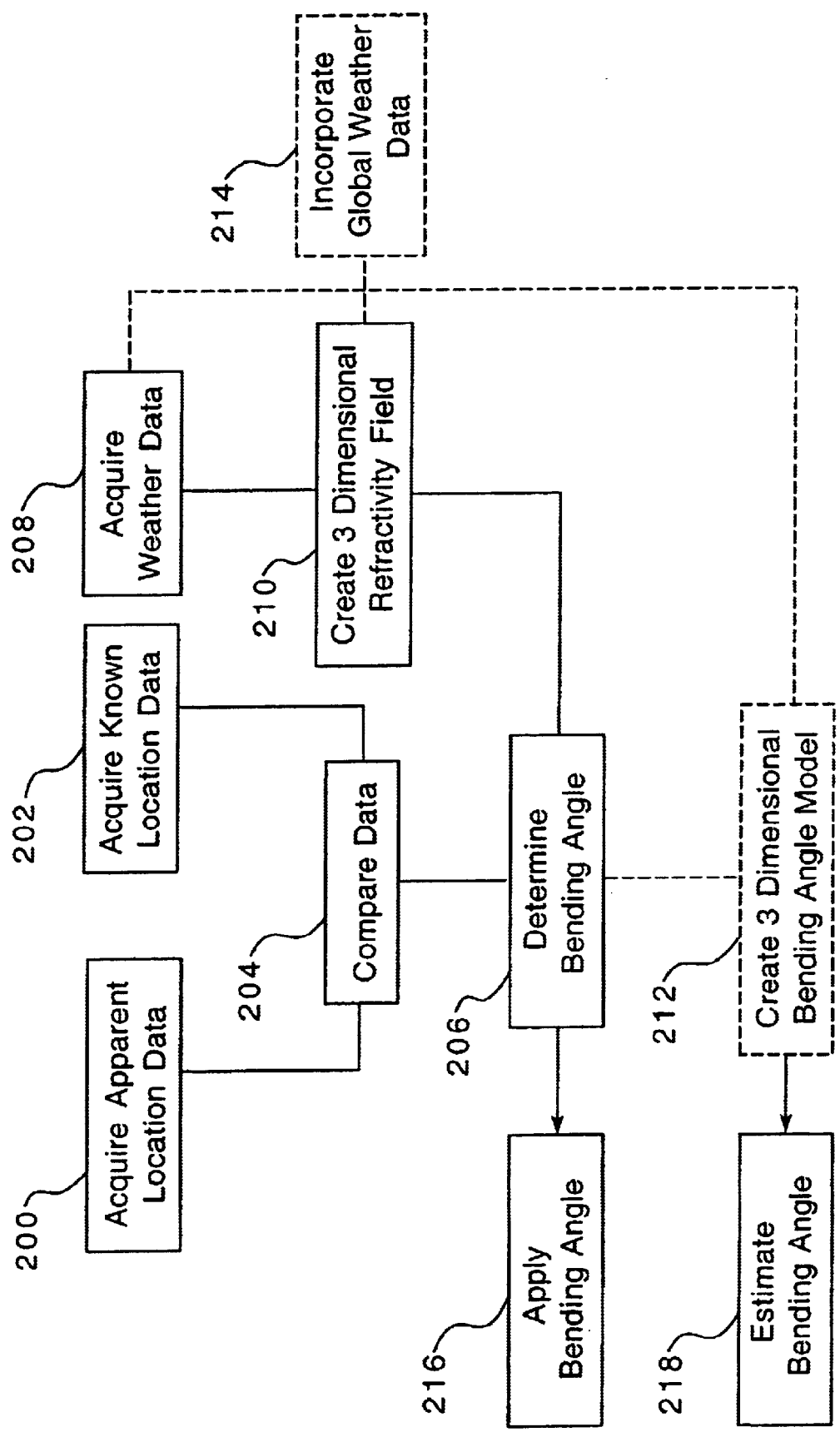
FIG. 3 is a flow chart of the method incorporating weather data.

The first method may be improved as shown in FIG. 3. Again, the first receiver 20 is used to acquire 200 the apparent location data 22. The known location data 30 is also acquired 202 through the communication medium 60. The apparent location data 22 and the known location data 30 is compared 204 and a bending angle is determined 206. Additionally, the weather station 40 near the radar site 10 acquires and logs 208 the local weather data 72. The local weather data 72 is used to create 210 a three-dimensional refractivity field. Data representing the refractivity field can be included in the determination of bending angle step 206 to improve the accuracy of the calculation. Both the local weather data 72 and the bending angle determination 206 can be recorded over time and used to create 212 a three-dimensional refractivity field model. This model relates the calculated bending angle to the weather conditions at the radar site 10. This method may be further improved by incorporating 214 global weather data 74 into the creation 210 of the three-dimensional refractivity field. As before, the location of a low elevation object 11, other than the satellite 1, may be determined by applying 216 the computed bending angle to apparent position of the object 11 as detected by the radar site 10, or, if no satellite 1 has recently risen or set at a point on the horizon adjacent to the object 11, the three dimensional refractivity field model may be used to estimate the bending angle to be applied 218 to the apparent location of the object 11.

Figure 4:
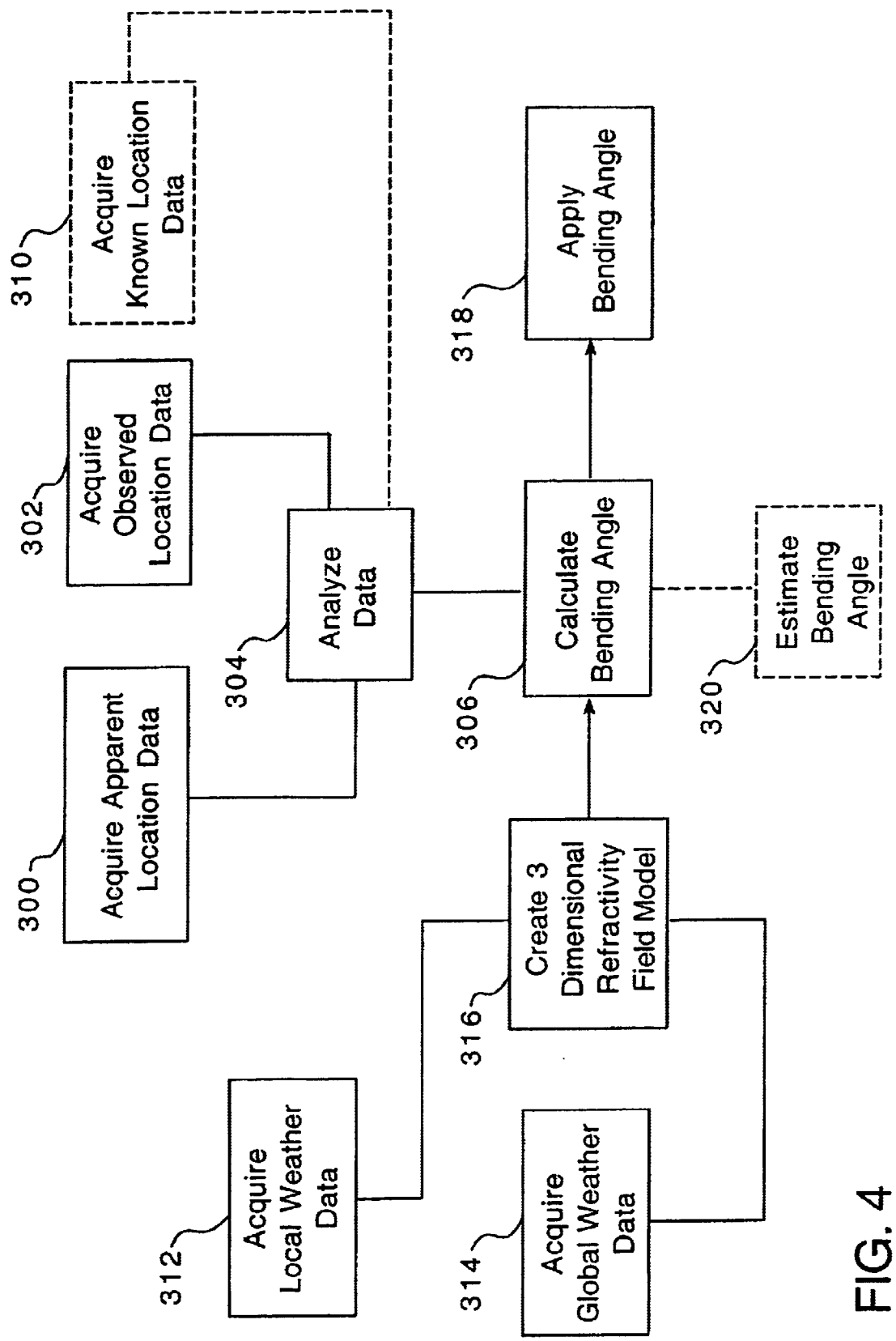
FIG. 4 is a flow chart of the method incorporating weather data and a second receiver.

As shown in FIG. 4, the second embodiment may be further improved by including observer location data 52 from the second receiver site 50. As noted above, the second receiver 50 is spaced from the first receiver 20, typically by more than 100 kilometers, so that when a satellite 1 is at a low elevation at the first receiver 20, the satellite 1 is at a high elevation at the second receiver 50. In this embodiment, as before, the apparent location data 22 of the satellite 1 is collected and logged 300 by the first receiver 20. Additionally, the observed location data 52 is collected and logged 302 by the second receiver 50. The apparent location data 22 and the observed location data 52 from the first and second receivers 20, 50 are analyzed 304 and used to calculate 306 the bending angle. Thus, this method is functional without the known location data 30 and may be used if the known location data 30 is not available. However, the known location data 30 may be acquired and logged 310 and included in the analysis of the data from the first and second receiver 304 to improve the calculation of the bending angle 306. This method can be further improved by creating a three dimensional refractivity field. That is, local weather data 72 from the weather station 40 is acquired and logged 312 and/or global weather data 74 from the National Weather Service is acquired and logged 314. The weather data 70 is used to create 316 a three-dimensional refractivity field model which is further used during the calculation of the bending angle 306.

As before, the location of a low elevation object 11, other than the satellite 1, may be determined by applying 318 the computed bending angle to apparent position of the object 11 as detected by the radar site 10, or, if no satellite 1 has recently risen or set at a point on the horizon adjacent to the object 11, the three-dimensional refractivity field model may be used to estimate the bending angle to be applied 320 to the apparent location of the object 11.

Figure 5:
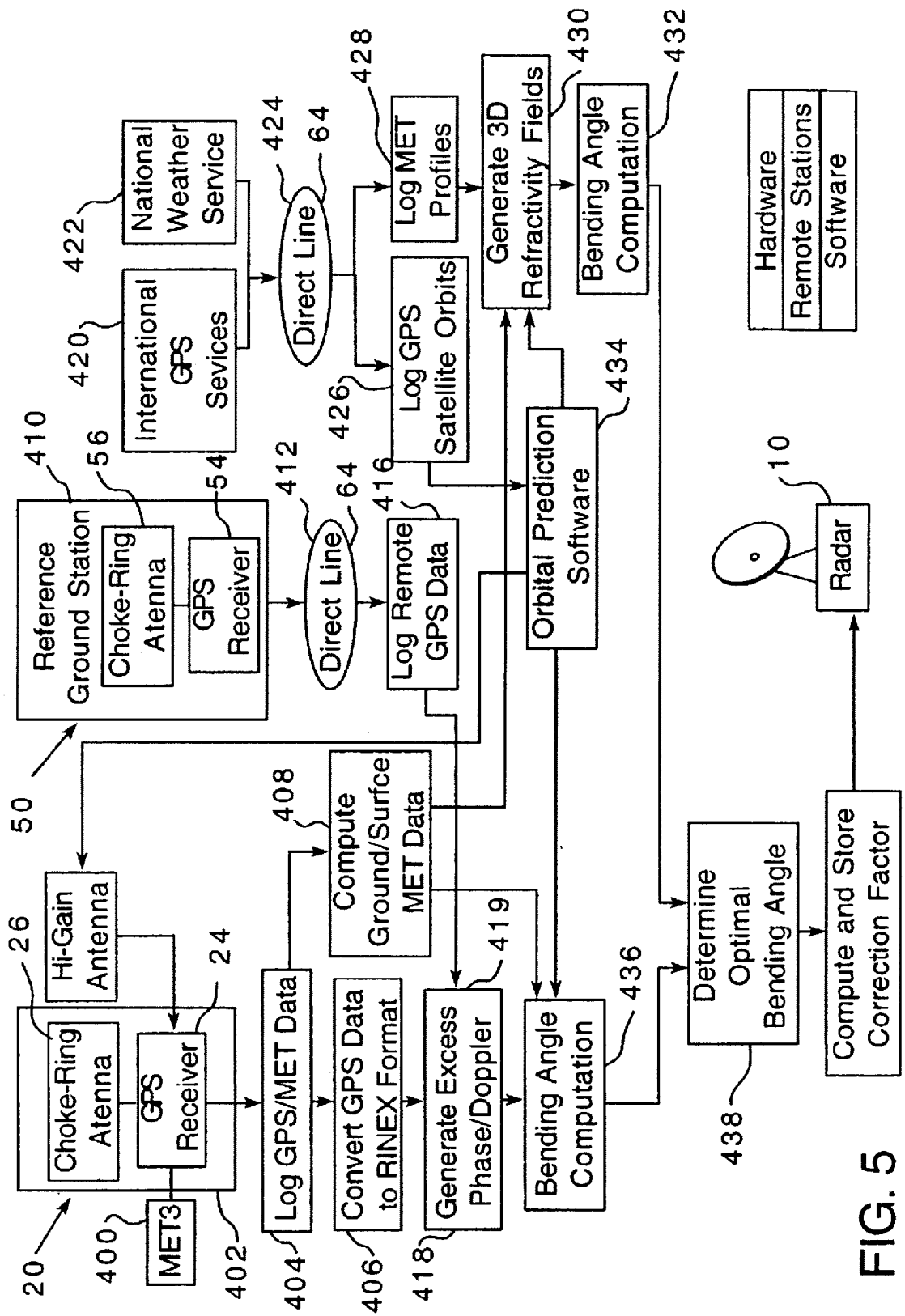
FIG. 5 is flow chart of an alternate embodiment of the method utilizing the Doppler shift in the GPS signal to calculate the bending angle.

An alternative method is shown in FIG. 5. The method shown in FIG. 5 utilizes the Doppler shift in the GPS signal to determine the bending angle. Thus, this system also utilizes both the first and second receivers 20, 50, the local weather station 40, the known location data 30, and the weather data 70. The know location data includes data as to the velocity of the satellite. The first and second receiver 20, 50 may include a GPS receiver 24, 54, and choke ring antenna 26, 56, respectively. The choke ring antenna 26, 56 enhances the accuracy of each GPS receiver 24, 54. When a GPS satellite 1 is at a low elevation relative to the radar site 10, the following steps occur. At the radar site 10, the weather station 40 is used to acquire 400 local weather data 72. The step of acquiring local weather data 400 may be performed slightly before the satellite 1 rises or sets. The first receiver 20 is then used to acquire 402 data representing the apparent location 22 and velocity of an occulting satellite 1. The local weather data 72 and apparent location data 22 is logged 404. The apparent location data 22 may be converted to a Receiver Independent Exchange, or RINEX, format 406. As is known in the art, RINEX data format includes meteorological data as well as navigation data. Binary Exchange, or BINEX, data may be used as an alternative to RINEX data. The logged local weather data 72 is also analyzed 408 in preparation for creating a three dimensional refractivity field. At the same time, the second receiver 50 is acquiring 410 data representing the observed location data 52 and velocity of the satellite 1. The observed location data 52 is transmitted 412 through the communication medium 60 and logged 416. In this embodiment the communication medium 60 is a direct line 64. At this point, both the apparent location data 22 and the observed location data 52 have been logged, 404, 416, respectively. As set forth below, the processing of the apparent location data 22 and the observed location data 52 may be completed with a comparison to the known location data 30.

Slightly prior to, or at the same time as, the preceding steps, the known location data 30 is acquired 420 from the International GPS Services database, and, the global weather data 74 is acquired 422 from the National Weather Service. Both the known location data 30 and the global weather data 74 are transmitted 424 through the communications medium 60, which again is shown as a direct line 64. The known location data 30 is then logged 426. Similarly, the global weather data 74 is logged 428. The global weather data 74 and the local weather data 72 are then analyzed to generate 430 a three dimensional refractivity field. The three-dimensional refractivity field model is then used to compute 432 a first bending angle. The known location data 30 may be further refined 434 by orbital prediction software. The orbital prediction software utilizes GPS satellite orbit parameter to predict the future location of the GPS satellites. This data may be used to ensure the radar site 10 and GPS receivers 20, 50 are tracking the proper satellite 1.

The known location data 30 is also passed to computer processing the apparent location data 22 and the observed location data 52. In this analysis, the apparent location data 22 and the observed location data 52 are compared and analyzed 418 to remove the phase change of the signal due to clock drift and satellite motion and thereby generate the excess phase/Doppler shift data 419 that is used to further generate the bending angle. The Doppler shift data 419 is then compared and analyzed with the known location data 30 and the local weather data 72 to compute 436 a second bending angle.

The first bending angle and the second bending angle are then further analyzed 438 to determine the optimal bending angle. The optimal bending angle data is further used to compute 440 a correction factor that is stored and used to determine the location of low elevation objects 11 detected by the radar site 10. The location detected by the radar and adjusted by the correction factor is less than 50 μrad from the actual location of the object.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of compensating for atmospheric effects while using near horizon radar to detect an object, said method utilizing a preexisting satellite structured to send a signal indicating the position and velocity of said satellite, said method comprising the steps of:
   a) providing a radar site, a first receiver structured to receive a signal from said satellite, a second receiver structured to receive a signal from said satellite, and weather data;
   b) positioning said first receiver near said radar site;
   c) positioning said second receiver at a distance from the radar site;
   d) utilizing said first receiver to receive a signal from said satellite when said satellite is at a low elevation relative to said radar site, said signal indicating the apparent location data of said satellite, while simultaneously utilizing said second receiver to receive a signal from said satellite when said satellite is at a high elevation relative to said second receiver, said signal indicating the observed location data of said satellite;
   e) comparing said signal from said first receiver relative to said signal from said second receiver to isolate the Doppler shift of said signal;
   f) analyzing the Doppler shift of said signal to determine the bending angle of the atmosphere;
   g) creating a three-dimensional refractivity field model based on said weather data and said bending angle data;
   h) using said radar site to detect the apparent location data of a low elevation object; and
   i) determining the location of the low elevation object by applying the bending angle to the apparent location data of the object.

2. The method of claim 1, wherein data representing the known location data of said satellite is maintained in a remote database and said method includes the further steps of:
   a) providing said satellite known location data; and
   b) including said known location data in said step of determining said bending angle.

3. The method of claim 2, wherein said step of providing said satellite known location data includes the step of acquiring the known location data through a communication medium.

4. The method of claim 1, wherein global weather data is maintained in a remote database and said step of providing said weather data includes the step of acquiring the global weather data through a communication medium.

5. The method of claim 4, wherein:
   said radar site includes a weather station; and
   said step of providing said weather data includes the step of acquiring local weather data from said weather station.

6. The method of claim 1, wherein:
   said radar site includes a weather station; and
   said step of providing said weather data includes the step of acquiring local weather data from said weather station.

7. The method of claim 1, wherein said satellite is a GPS satellite.

8. A method of compensating for atmospheric effects while using near horizon radar to detect an object, said method utilizing a preexisting satellite structured to send a signal indicating the position and velocity of said satellite, said method comprising the steps of:
   a) providing a radar site, a first receiver structured to receive a signal from said satellite, a second receiver structured to receive a signal from said satellite, and weather data;
   b) positioning said first receiver near said radar site;
   c) positioning said second receiver at a distance from the radar site;
   d) utilizing said first receiver to receive a signal from said satellite when said satellite is at a low elevation relative to said radar site, said signal indicating the apparent location data of said satellite, while simultaneously utilizing said second receiver to receive a signal from said satellite when said satellite is at a high elevation relative to said second receiver, said signal indicating the observed location data of said satellite;
   e) comparing said signal from said first receiver relative to said signal from said second receiver to isolate the Doppler shift of said signal;
   f) analyzing the Doppler shift of said signal to determine the bending angle of the atmosphere; and
   g) creating a three-dimensional refractivity field model based on said weather data and said bending angle data.

9. The method of claim 8, wherein data representing the known location data of said satellite is maintained in a remote database and said method includes the further steps of:
   a) providing said satellite known location data; and
   b) including said known location data in said step of determining said bending angle.

10. The method of claim 9, wherein said step of providing said satellite known location data includes the step of acquiring the known location data through a communication medium.

11. The method of claim 8, wherein global weather data is maintained in a remote database and said step of providing said weather data includes the step of acquiring the global weather data through a communication medium.

12. The method of claim 11, wherein:
   said radar site includes a weather station; and
   said step of providing said weather data includes the step of acquiring local weather data from said weather station.

13. The method of claim 8, wherein:
   said radar site includes a weather station; and
   said step of providing said weather data includes the step of acquiring local er data from said weather station.

14. The method of claim 8, wherein said satellite is a GPS satellite.

15. The method of claim 8, wherein said apparent location data and said observed location data is converted to RINEX format prior to computation of the bending angle.

* * * * *

UNITED STATES PATENT AND TRADEMARK OFFICE
CERTIFICATE OF CORRECTION

PATENT NO. : 6,853,331 B1
DATED : February 8, 2005
INVENTOR(S) : Mikhail S. Belen'kii It is certified that error appears in the above-identified patent and that said Letters Patent is hereby corrected as shown below:

Column 2,
Line 67, "grad" should read -- $\mu$rad --.

Column 8,
Line 60, "er" should read -- weather --.

Signed and Sealed this

Tenth Day of May, 2005

JON W. DUDAS
*Director of the United States Patent and Trademark Office*